(12) United States Patent
Severac et al.

(10) Patent No.: US 8,916,058 B2
(45) Date of Patent: Dec. 23, 2014

(54) FLUOROBETAINE COPOLYMER AND FIRE FIGHTING FOAM CONCENTRATES THEREFROM

(75) Inventors: Romain Severac, Garginville (FR); Martial Jean-Jacques Pabon, Prevessin (FR); Isabelle Deguerry, Epone (FR); Guillaume Gamblin, Le Petit Quevilly (FR)

(73) Assignee: E I du Pont de Nemours and Company, Wilmington, DE (US)

(*) Notice: Subject to any disclaimer, the term of this patent is extended or adjusted under 35 U.S.C. 154(b) by 817 days.

(21) Appl. No.: 12/531,757

(22) PCT Filed: Mar. 14, 2008

(86) PCT No.: PCT/US2008/003477
§ 371 (c)(1),
(2), (4) Date: Mar. 10, 2010

(87) PCT Pub. No.: WO2008/115457
PCT Pub. Date: Sep. 25, 2008

(65) Prior Publication Data
US 2010/0168318 A1    Jul. 1, 2010

(30) Foreign Application Priority Data
Mar. 21, 2007  (EP) .................... 07104542

(51) Int. Cl.
| A62D 1/00 | (2006.01) |
| C08F 214/20 | (2006.01) |
| C08F 214/18 | (2006.01) |
| C08F 220/24 | (2006.01) |
| C08F 220/38 | (2006.01) |

(52) U.S. Cl.
CPC ............. *C08F 214/18* (2013.01); *C08F 214/20* (2013.01); *C08F 220/24* (2013.01); *C08F 220/38* (2013.01)
USPC ............... 252/3; 526/243; 526/245; 526/248; 526/311; 525/326.4

(58) Field of Classification Search
USPC .............. 526/243, 245, 248, 311; 525/326.4; 252/3
See application file for complete search history.

(56) References Cited

U.S. PATENT DOCUMENTS

| 2,642,416 | A | | 6/1953 | Ahlbrecht et al. | |
| 2,803,615 | A | * | 8/1957 | Brown et al. | 524/805 |
| 3,102,103 | A | | 8/1963 | Ahlbrecht et al. | |
| 3,207,730 | A | | 9/1965 | Guenthner | |
| 3,258,423 | A | | 6/1966 | Tuve et al. | |
| 3,282,905 | A | | 11/1966 | Fasick et al. | |
| 3,384,627 | A | | 5/1968 | Anello et al. | |
| 3,392,046 | A | | 7/1968 | Marder | |
| 3,532,659 | A | | 10/1970 | Hagar et al. | |
| 3,721,706 | A | | 3/1973 | Hoffmann et al. | |
| 3,854,535 | A | | 12/1974 | Kehr et al. | |
| 4,127,711 | A | * | 11/1978 | Lore et al. | 526/245 |
| 4,158,678 | A | | 6/1979 | Tatemoto et al. | |
| 4,174,851 | A | | 11/1979 | Huret | |
| 4,303,534 | A | * | 12/1981 | Hisamoto et al. | 252/3 |
| 4,424,133 | A | | 1/1984 | Mulligan | |
| 4,536,298 | A | | 8/1985 | Kamei et al. | |
| 4,859,754 | A | * | 8/1989 | Maekawa et al. | 526/245 |
| 5,085,786 | A | * | 2/1992 | Alm et al. | 252/8.05 |
| 5,231,154 | A | | 7/1993 | Hung | |
| 5,439,998 | A | | 8/1995 | Lina et al. | |
| 5,512,644 | A | * | 4/1996 | Ogura et al. | 526/258 |
| 5,567,857 | A | | 10/1996 | Huang et al. | |
| 5,679,752 | A | | 10/1997 | Arudi et al. | |
| 5,739,236 | A | * | 4/1998 | Bowers et al. | 526/277 |
| 6,201,122 | B1 | | 3/2001 | Dams | |
| 6,221,988 | B1 | * | 4/2001 | Mueller et al. | 526/243 |
| 6,346,588 | B1 | | 2/2002 | Fenchl et al. | |
| 6,365,676 | B1 | | 4/2002 | Jennings et al. | |
| 6,518,345 | B2 | * | 2/2003 | Tanaka et al. | 252/8.05 |
| 6,521,730 | B1 | | 2/2003 | Pabon et al. | |
| 6,642,318 | B1 | | 11/2003 | Chiefari et al. | |
| 6,891,011 | B2 | * | 5/2005 | Morschhauser et al. | 526/288 |
| 2001/0001478 | A1 | | 5/2001 | Dams et al. | |
| 2010/0168318 | A1 | | 7/2010 | Severac et al. | |

FOREIGN PATENT DOCUMENTS

| CA | 2678797 A1 | 9/2008 |
| DE | 1158265 | 11/1963 |
| DE | 2829594 A1 | 1/1979 |
| EP | 765676 A1 | 4/1997 |
| EP | 1972645 B1 | 11/2009 |
| GB | 1264681 | 2/1972 |
| GB | 1298291 | 11/1972 |
| GB | 1543084 A * | 3/1979 |
| JP | 49-6077 A | 1/1974 |
| JP | 56-078834 A | 6/1981 |
| JP | 61-236806 A | 10/1986 |
| JP | 02121681 A * | 5/1990 |
| JP | 2010522256 T | 7/2010 |
| KR | 2010015412 A | 2/2010 |
| NL | 6409858 | 3/1965 |
| WO | 9003966 A1 | 4/1990 |
| WO | 2008/115457 A2 | 9/2008 |

OTHER PUBLICATIONS

Translation of JP 02121681 A, Oct. 2013.*
International Search Report, PCT/US2008/003477, Dated Mar. 14, 2008.
Kretschmann, Macromolecular Chemistry and Physics, 2006, 207, 987-992.
Official Notice of Rejection, Japanese Patent Application No. 2009-554544, Mailed on Sep. 7, 2012, English Translation (JP1974-006077).

\* cited by examiner

*Primary Examiner* — Nicole M Buie-Hatcher

(57) ABSTRACT

It has been discovered by in present invention that, compared with a fluorosurfactant having only one betaine group per molecule, a fluorosurfactant having a plurality of betaine groups per molecule is superior in its ability to undergo electrostatic interaction with other components of a fire fighting composition thereby improving the performance of the fire fighting composition. Previously known fluorosurfactants comprise only one betaine group per molecule. In contrast, the present invention provides for a fluorobetaine copolymer containing a plurality of betaine groups.

13 Claims, No Drawings

FLUOROBETAINE COPOLYMER AND FIRE FIGHTING FOAM CONCENTRATES THEREFROM

FIELD OF THE INVENTION

This invention relates to a fluorobetaine copolymer, the manufacture thereof, and the use thereof for use in a fire fighting foam concentrate.

BACKGROUND OF THE INVENTION

Fluorosurfactants which incorporate betaine groups are known for use as additives in fire extinguishing compositions. For example U.S. Pat. No. 6,521,730 discloses a fluorosurfactant having a betaine group represented by the formula ($N^+$—$CH_2$—$CO_2^-$). The betaine group allows such fluorosurfactants to undergo electrostatic interactions with other components in a fire fighting composition therefore improving performance.

U.S. Pat. No. 6,518,345 which discloses a fire fighting composition comprising a betaine containing fluorosurfactant, a polyethyleneimine, and a polybasic acid. The polybasic acid is necessary for the purpose of undergoing electrostatic interactions with the polyethyleneimine thereby improving the flame resistance and fuel resistance of the composition. Apparently, the fluorosurfactant alone could not sufficiently undergo electrostatic interaction with the polyethyleneimine to improve the flame resistance and fuel resistance.

It would be desirable to discover a fluorosurfactant having an increased ability to undergo electrostatic interaction with other components of a fire fighting composition thereby improving the performance of the fire fighting composition.

BRIEF SUMMARY OF THE INVENTION

It has been discovered in the present invention that, compared with a fluorosurfactant having only one betaine group per molecule, a fluorosurfactant having a plurality of betaine groups per molecule is superior in its ability to undergo electrostatic interaction with other components of a fire fighting foam concentrate thereby improving the performance of the fire fighting foam concentrate. Previously known fluorosurfactants, such as those disclosed in U.S. Pat. Nos. 6,521,730 and 6,518,345, comprise only one betaine group per molecule. In contrast, the present invention provides for a fluorobetaine copolymer comprising a plurality of betaine groups denoted as $R_B$ in the formula below.

Fluorobetaine copolymers of the present invention comprise units represented by the following formula:

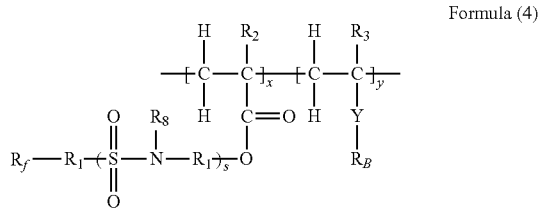

Formula (4)

wherein $R_f$ represents a perfluorinated alkyl group, optionally interrupted by oxygen, having at least 3 carbon atoms and preferably 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl, preferably $C_1$-$C_5$, more preferably linear, and even more preferably ethyl; $R_2$ is chosen from hydrogen, fluorine, or a $C_1$-$C_4$ alkyl and is preferably hydrogen or methyl; s is 0 or 1, preferably 1; Y is benzyl or carbonyl, preferably carbonyl; $R_B$ is a group with the formula $C_aN_bO_cS_fH_{2(a-e)+b+1-2d}$ having a structure which incorporates at least one betaine group of the formula ($N^+$—$C_n$—$H_{2n}$—$CO_2^-$) or ($N^+$—$C_n$—$H_{2n}$—$SO_3^-$) wherein a is an integer from 4-25, b is an integer from 1 to 4, c is an integer from 2 to 15, d integer from 0 to 3, e is an integer from 0 to 4, f is an integer from 0 to 4, the sum of e and f is from 1 to 4; n is independently chosen from an integer from 1 to 5; and $R_3$ is chosen from hydrogen or a $C_1$-$C_4$ hydrocarbyl and is preferably hydrogen or methyl; and x is an integer from 1 to 10, y is an integer from 4 to 200, and the ratio of y:x is at least 1:1.

The fluorobetaine copolymer of the present invention can be made in two steps, the first step being the polymerization of monomers comprising at least one fluorinated acrylate monomer and at least one amino vinyl monomer represented respectively by Formula (1) and Formula (2) as follows:

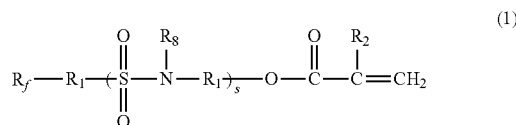

(1)

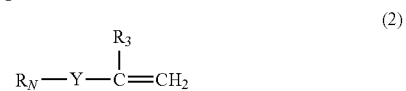

(2)

wherein $R_f$ represents a perfluorinated alkyl group, optionally interrupted by oxygen, having at least 3 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, more preferably linear, and even more preferably hydrogen or methyl; $R_2$ is chosen from hydrogen, fluorine, or a $C_1$-$C_4$ alkyl and is preferably hydrogen or methyl; s is 0 or 1, preferably 1; $R_N$ is a group incorporating at least one tertiary amine said group having the formula $C_aN_bO_cH_{2a+b+1-2d}$ where a is an integer from 3 to 20, preferably 3 to 15, b is a positive integer from 1 to 4, and c is an integer from 0 to 4, and d is an integer from 0 to 4; and Y is carbonyl or benzyl, preferably carbonyl; and $R_3$ is chosen from hydrogen or a $C_1$-$C_4$ hydrocarbyl and is preferably hydrogen or methyl.

The second step of making the fluorobetaine copolymer is betaine conversion wherein a polymer obtained in the first step is reacted with a compound which converts at least a portion of the tertiary amines contained therein. Betaine conversion can be accomplished by reacting the polymer obtained in the first step with at least one betaine precursor such as an aliphatic halocarboxylic acid having the formula X-A-COOH wherein X is a halogen, preferably chlorine; A is a $C_1$ to $C_4$ alkylene, preferably $C_1$ to $C_2$. Another example of a betaine precursor is an aliphatic halosulfonic acid having the formula X-A-$SO_3$H wherein X is a halogen, preferably chlorine; A is a $C_1$ to $C_4$ alkylene, preferably $C_1$ to $C_2$. The aliphatic halocarboxylic acid and/or aliphatic halosulfonic acid is preferably used in the form of its salt, such as an organic salt or alkaline earth metal salt, and more preferably its alkali metal salt. A betaine precursor particularly suitable for the invention is sodium chloroacetate. Betaine conversation may also be accomplished with a lactone, preferably a β-lactone such as β-propiolactone.

The fluorobetaine copolymers according to the invention lower the surface tension of aqueous solutions and are useful foaming agents and therefore are useful as additives in multipurpose fire fighting foam concentrate, in particular, fire fighting foam concentrates intended for combating hydrocarbon fires, such as fires in which the hydrocarbons are petrols, oils, diesel oil, fuel oil, heptane, hexane or cyclohexane, or polar liquid fires, such as fires in which the polar liquids are alcohols (for example, methanol, ethanol and isopropanol), ketones (for example, dimethyl ketone and methyl isobutyl ketone), esters (for example, n-butyl acetate) and ethers (for example, methyl tert-butyl ether). The fluorobetaine copolymers are also useful as additives in multipurpose fire fighting foam concentrate intended for combating Class A fires which are fires fueled by burning materials which leave an ash residue such as paper, wood, cloth, rubber, and certain plastics.

The fire fighting foam concentrates of the present invention preferably include a polyethyleneimine. The fire fighting foam concentrates of the present invention preferably include a hydrocarbon surfactant. The fire fighting foam concentrates of the present invention preferably include a monobasic acid, polybasic acid or mixtures thereof. Because of the betaine fluorocopolymer, the fire fighting foam concentrates are capable of excluding any polybasic acid.

DETAILED DESCRIPTION OF THE INVENTION

The fluorobetaine copolymer of the present invention can be made in two steps, the first step being the polymerization of monomers comprising at least one fluorinated acrylate monomer and at least one amino vinyl monomer represented respectively by Formula (1) and Formula (2) as follows:

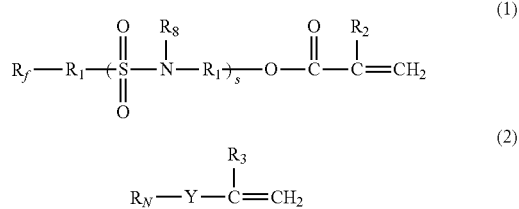

wherein $R_f$ represents a perfluorinated alkyl group, optionally interrupted by oxygen, having at least 3 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, more preferably linear, and even more preferably hydrogen or methyl; $R_2$ is chosen from hydrogen, fluorine, or a $C_1$-$C_4$ alkyl and is preferably hydrogen or methyl; s is 0 or 1, preferably 1; $R_N$ is a group incorporating at least one tertiary amine said group having the formula $C_aN_bO_cH_{2a+b+1-2d}$ where a is an integer from 3 to 20, preferably 3 to 15, b is a positive integer from 1 to 4, and c is an integer from 0 to 4, and d is an integer from 0 to 4; and Y is carbonyl or benzyl, preferably carbonyl; and $R_3$ is chosen from hydrogen or a $C_1$-$C_4$ hydrocarbyl and is preferably hydrogen or methyl. The term "hydrocarbyl" as used throughout is intended to mean a univalent group formed by removing a hydrogen atom from a hydrocarbon. The term "hydrocarbylene" as used throughout is intended to mean a divalent group formed by removing two hydrogens from a hydrocarbon, the free valencies of which are not engaged in a double bond.

Examples of suitable fluorinated acrylate monomers of Formula (1) wherein s=0 are disclosed in U.S. Pat. Nos. 4,174,851, 2,642,416, 3,384,627, 3,392,046, 3,282,905, 3,532,659, 3,102,103, all of which are hereby incorporated by reference to the extent permitted by applicable law. Specific examples of suitable fluorinated acrylate monomers of Formula (1) wherein s=0 include perfluorobutylethyl acrylate, perfluorohexylethyl acrylate, perfluorobutylethyl methacrylate, and perfluorohexylethyl methacrylate. Examples of suitable fluorinated acrylate monomers of Formula (1) wherein s=1 are disclosed in U.S. Pat. No. 5,439,998 which is hereby incorporated by reference to the extent permitted by applicable law. Specific examples of suitable fluorinated acrylate monomers of Formula (1) wherein s=1 include 2-[methyl[(3,3,4,4,5,5,6,6,7,7,8,8,8-tridecafluorooctyl)sulfonyl]amino]ethyl acrylate; 2-[methyl[(3,3,4,4,5,5,6,6,6-nonafluorohexyl)sulfonyl]amino]ethyl acrylate; 2-[methyl[(2,2,3,3,4,4,5,5,6,6,7,7,7-tridecafluoroheptyl)sulfonyl]amino]ethyl acrylate; 2-[methyl[(3,3,4,4,5,5,6,6,7,7,8,8,8-tridecafluorooctyl)sulfonyl]amino]ethyl methacrylate; [methyl[(3,3,4,4,5,5,6,6,6-nonafluorohexyl)sulfonyl]amino]ethyl methacrylate; and 2-[methyl[(2,2,3,3,4,4,5,5,6,6,7,7,7-tridecafluoroheptyl)sulfonyl]amino]ethyl methacrylate.

Examples Formula (2) depicting suitable $R_N$ groups include:

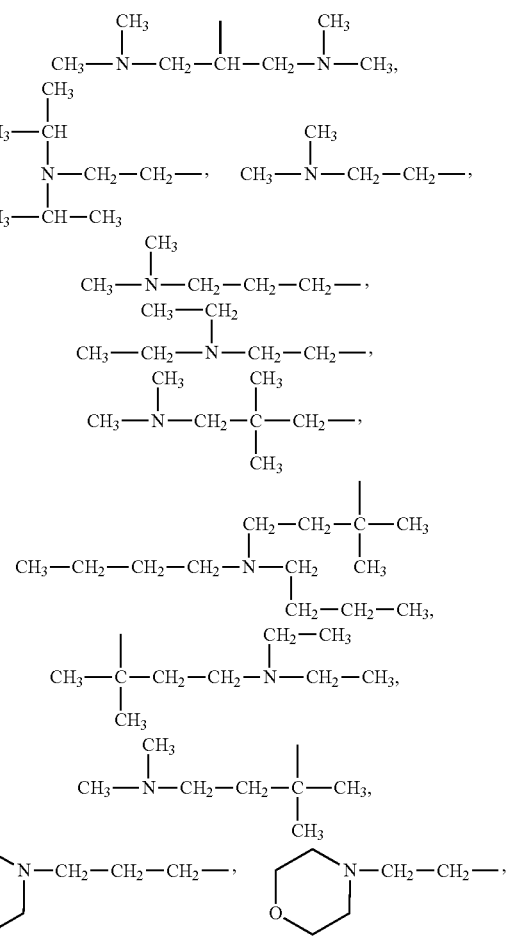

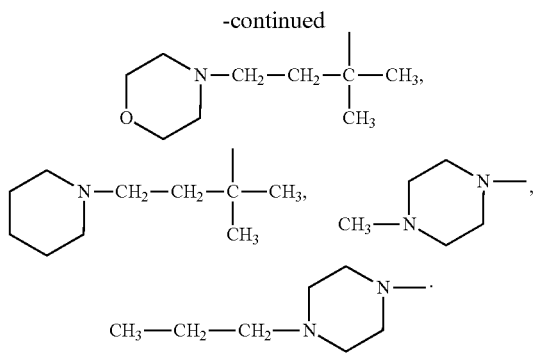

Specific examples of amino vinyl monomers of Formula (2) include 2-(dimethylamino)-1-[(dimethylamino)methyl]ethyl acrylate, 3-(dimethylamino)-2,2-dimethylpropyl acrylate, 2-(4-morpholinyl)ethyl acrylate, 2-(4-morpholinyl)ethyl methacrylate, 2-(1-piperidinyl)ethyl methacrylate, 2-(1-piperidinyl)ethyl acrylate, 3-(dimethylamino)propyl acrylate, 2-[bis(1-methylethyl)amino]ethyl methacrylate, 2-(dimethylamino)ethyl acrylate, 2-(diethylamino)ethyl acrylate, 2-(diethylamino)ethyl methacrylate, N-[3-(dibutylamino)-1,1-dimethylpropyl]-2-methyl-methacrylamide, N-[3-(diethylamino)-1,1-dimethylpropyl]-2-methyl-methacrylamide, N-Acryloyl-N'-propylpiperazine, N-[1,1-dimethyl-3-(4-morpholinyl)propyl]-acrylamide, N-[1,1-dimethyl-3-(1-piperidinyl)propyl]-acrylamide, N-[3-(diethylamino)-1,1-dimethylpropyl]-acrylamide, 1-methyl-4-(2-methyl-1-oxo-2-propenyl)-piperazine, N-[3-(4-morpholinyl)propyl]-acrylamide, N-[3-(dimethylamino)-1,1-dimethylpropyl]-2-methyl-methacrylamide, N-[3-(dimethylamino)-1,1-dimethylpropyl]-acrylamide, N-[2-(diethylamino)ethyl]-2-methyl-methacrylamide, N-[2-(dimethylamino)ethyl]-2-methyl-methacrylamide, N-[3-(dimethylamino)propyl]-2-methyl-methacrylamide, N-[3-(dimethylamino)propyl]-acrylamide, N-[2-(dimethylamino)ethyl]-acrylamide, 4-Ethenyl-N,N-dimethylbenzylamine, and N-(p-Vinylbenzyl)dibutylamine.

The polymerization during the first step is free radical polymerization conducted in an organic solvent and enabled with a free radical initiator and a chain transfer agent for controlling molecular weight. Examples of free radical initiators include: azo compounds, such as azobisisobutyronitrile and azo-2-cyanovaleric acid; hydroperoxides, such as cumene, t-butyl and t-amyl hydroperoxide; dialkyl peroxides, such as di-t-butyl and dicumylperoxide; peroxyesters, such as t-butylperbenzoate and di-t-butylperoxy phthalate; and diacylperoxides, such as benzoyl peroxide and lauroyl peroxide. Examples of chain transfer agents include mercaptoethanol, mercaptoacetic acid, stearylmercaptane, tert-dodecylmercaptane, trichloromethane, diethyl phosphate, methanol and the like, and mixtures thereof. Examples of suitable organic solvents include: alcohols, such as 2-methylpropan-2-ol, isopropanol, 2-methoxypropan-2-ol; and ketones, such as acetone, methylisobutyl ketone, and methylethyl ketone; and pyrrolidones, such as n-methyl-2-pyrrolidone and the like, and mixtures thereof.

Free radical polymerization of monomers comprising a fluorinated acrylate monomer of Formula (1) and an amino vinyl monomer of Formula (2) can be conducted by dissolving the monomers, free radical initiator, and chain transfer agent in an organic solvent. The solution can be heated and maintained at about 40 to 100° C., more preferably about 55 to 85° C., and allowed to react under inert conditions for a period of time to obtain at least 95 percent yield of polymer. Polymer yield may be determined by measuring the amount of residual monomer by gas chromatography.

The concentration of monomers in the reaction solvent is preferably from 30 to 70 weight percent. The weight ratio of amino vinyl monomer to fluorinated acrylate monomer is preferably at least 1:1. Initiator is preferably added in an amount of 0.1 to 2 molar percentage of total monomers. Chain transfer agent(s) can be added in an amount to yield a polymer with a desirable targeted molecular weight which can be determined by summing the weight of monomers in grams and dividing the sum by the total moles of chain transfer agent(s) used, and then adding to this quotient the weighted average of the molecular weight of the chain transfer agent(s) used. Preferable targeted molecular weights for fire extinguishing applications are no more than 40,000 g·mol$^{-1}$, more preferably no more than 20,000 g·mol$^{-1}$, and most preferably no more than 10,000 g·mol$^{-1}$.

In the invention, free radical polymerization may also be conducted by "controlled free radical polymerization," examples of which include: Atom Transfer Radical Polymerization (ATRP), Reversible Addition Fragmentation chain Transfer polymerization (RAFT), Iodine Transfer Polymerization (ITP), Reversible Iodine Transfer Polymerization (RITP), Macromolecular Design via the Interchange of Xanthates (MADIX), and Nitroxide Mediated Polymerization (NMP). Of these mechanisms, RAFT and ITP are preferred for use in the invention.

The RAFT mechanism employs a dithioester group containing compounds as free radical initiators and is described in U.S. Pat. No. 6,642,318; hereby incorporated by reference to the extent permitted by applicable law. The ITP mechanism employs an iodo containing chain transfer agent and is described in U.S. Pat. Nos. 4,158,678; 5,231,154; both of which are hereby incorporated by reference to the extent permitted by applicable law.

The polymer obtained after the free radical polymerization of the first step comprises units represented by Formula (3) as follows:

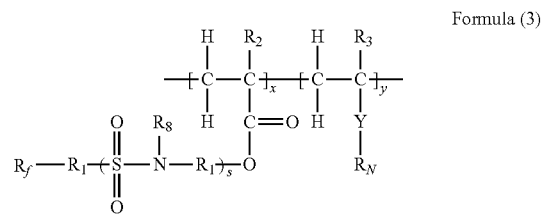

Formula (3)

wherein $R_f$ represents a perfluorinated alkyl group, optionally interrupted by oxygen, having at least 3 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, more preferably linear, and even more preferably hydrogen or methyl; $R_2$ is chosen from hydrogen, fluorine, or a $C_1$-$C_4$ alkyl and is preferably hydrogen or methyl; s is 0 or 1, preferably 1; $R_N$ is a group incorporating at least one tertiary amine said group having the formula $C_aN_bO_cH_{2a|b|1-2d}$ where a is an integer from 3 to 20, preferably 3 to 15, b is a positive integer from 1 to 4, and c is an integer from 0 to 4, and d is an integer from 0 to 4; and Y is carbonyl or benzyl, preferably carbonyl; and $R_3$ is chosen from hydrogen or a $C_1$-$C_4$ hydrocarbyl and is preferably hydrogen or methyl; and x is an integer from 1 to 10, y is an integer from 4 to 200, and the ratio of y:x is at least 1:1.

The second step of making the fluorobetaine copolymer is betaine conversion wherein a polymer of Formula (3) is reacted with a compound which converts at least a portion of the tertiary amines in the pendant groups identified as $R_N$. Betaine conversion can be accomplished by compounds well known in the art for reacting with tertiary amine groups to form betaine groups.

Betaine conversion can be accomplished by reacting the polymer obtained in the first step, i.e., Formula (3), with at least one betaine precursor such as an aliphatic halocarboxylic acid having the formula X-A-COOH wherein X is a halogen, preferably chlorine; A is a $C_1$ to $C_4$ alkylene, preferably $C_1$ to $C_2$. Another example of a betaine precursor is an aliphatic halosulfonic acid having the formula X-A-$SO_3$H wherein X is a halogen, preferably chlorine; A is a $C_1$ to $C_4$ alkylene, preferably $C_1$ to $C_2$. The aliphatic halocarboxylic acid and/or aliphatic halosulfonic acid is preferably used in the form of its salt, such as an organic salt or alkaline earth metal salt, and more preferably its alkali metal salt. The term "alkylene" as used throughout is intended to mean an acyclic carbon or a saturated acyclic carbon chain represented by the formula $C_nH_{2n}$. An aqueous solution of the betaine precursor can be mixed with a polymer of Formula (3) dissolved in an organic solution. This organic solution conveniently can be the medium in which the polymer was made. The mixture can be heated to about 40 to 100° C., more preferably about 60 to 90° C., for a period of time preferable to convert significantly all of the tertiary amines into betaines, typically over about 1 hour. The organic solvent can then be removed by distillation.

Betaine conversation may also be accomplished with a lactone, preferably a β-lactone such as β-propiolactone.

Fluorobetaine copolymers of the present invention comprise units represented by Formula (4) as follows:

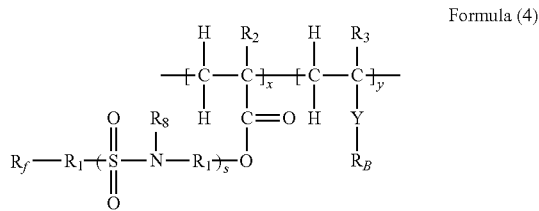

Formula (4)

wherein $R_f$ represents a perfluorinated alkyl group, optionally interrupted by oxygen, having at least 3 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, more preferably linear, and even more preferably hydrogen or methyl; $R_2$ is chosen from hydrogen, fluorine, or a $C_1$-$C_4$ alkyl and is preferably hydrogen or methyl; s is 0 or 1, preferably 1; Y is benzyl or carbonyl, preferably carbonyl; $R_B$ is a group with the formula $C_aN_bO_c$-$S_fH_{2(a-e)+b+1-2d}$ having a structure which incorporates at least one betaine group of the formula ($N^+$—$C_n$—$H_{2n}$—$CO_2^-$) or ($N^+$—$C_nH_{2n}$—$SO_3^-$) wherein a is an integer from 4-25, b is an integer from 1 to 4, c is an integer from 2 to 15, d integer from 0 to 3, e is an integer from 0 to 4, f is an integer from 0 to 4, the sum of e and f is from 1 to 4; n is independently chosen from an integer from 1 to 5; and $R_3$ is chosen from hydrogen or a $C_1$-$C_4$ hydrocarbyl and is preferably hydrogen or methyl; and x is an integer from 1 to 10, y is an integer from 4 to 200, and the ratio of y:x is at least 1:1.

The fluorobetaine copolymers according to the invention lower the surface tension of aqueous solutions and are useful foaming agents and therefore are useful as additives in multipurpose fire fighting foam concentrates, in particular, fire fighting foam concentrates intended for combating hydrocarbon fires, such as fires in which the hydrocarbons are petrols, oils, diesel oil, fuel oil, heptane, hexane or cyclohexane, or polar liquid fires, such as fires in which the polar liquids are alcohols (for example, methanol, ethanol and isopropanol), ketones (for example, dimethyl ketone and methyl isobutyl ketone), esters (for example, n-butyl acetate) and ethers (for example, methyl tert-butyl ether). The fluorobetaine copolymers are also useful as additives in multipurpose fire fighting foam concentrates or compositions intended for combating Class A fires which are fires fueled by burning materials which leave an ash residue such as paper, wood, cloth, rubber, and certain plastics.

Fire fighting foam concentrates are liquid compositions intended for combating combustible liquid fires, particularly those caused by hydrocarbons and/or polar liquids). Typically at the time of use, the foam concentrates are diluted in municipal water or seawater, generally at a concentration by weight of 3% (that is to say, 3 parts by weight of foam concentrates per 97 parts by weight of water) or 6% (6 parts by weight of foam concentrate per 94 parts by weight of water) but also, and more rarely 1% (1 part by weight of foam concentrate per 99 parts by weight of water). The foaming solution can be obtained by diluting the foam concentrate with water. This foaming solution passes through a fire hose nozzle where mechanical agitation takes place with incorporation of air, which generates an extinguishing foam used to combat combustible liquid fires.

When the fluorobetaine copolymers according to the invention are incorporated in the foam concentrates, they improve the stability of the extinguishing foams on a polar liquid and thus their extinguishing performance on fires of this type. Their content in the foam concentrates can generally range from 0.1 to 10 percent by weight and preferably from 0.2 to 5 percent by weight.

The foam concentrates in which the fluorobetaine copolymers can be incorporated are of two types, depending upon the origin of their foaming base. Synthetic foam concentrates, the foaming base of which is composed of at least one hydrocarbonaceous surface-active agent, and protein foam concentrates, the foaming base of which is composed of an animal protein hydrolysate, are distinguished. These two types of foam concentrates can comprise, according to their destination, one or more fluorosurfactants, one or more foam-stabilizing cosolvents, a hydrophilic polymer of high molecular weight of the polysaccharide type with a thixotropic and alcohol-repellent nature, an antifreezing agent, a corrosion-inhibiting agent, a preservative, a pH stabilizer or inorganic salts in which the cation is divalent, such as, for example, the magnesium ion or the calcium ion In addition to the fluorobetaine copolymer of Formula (4), the fire fighting foam concentrates of the present invention preferably include a polyethyleneimine. The term "polyethyleneimine" as used herein includes polyethyleneimine and derivatives thereof. Examples of useful polyethyleneimines are disclosed in U.S. Pat. No. 6,518,345 hereby incorporated by reference to the extent permitted by applicable law. Specific examples of the polyethyleneimine useful in the fire extinguishing composition identified by their trade names include: LUPASOL PS with an average molecular weight of about 750,000 g·$mol^{-1}$, solids content of about 31.5-34.5 weight percent, commercially available from BASF AG; LUPASOL HF with an average molecular weight of about 25,000 g·mol$^{-1}$, solids content of about 56 weight percent, commercially available from BASF AG; and EPOMIN 1050 with an average molecular weight of about 70,000 g·mol$^{-1}$, solids content of about 50 weight percent, commercially available from Nippon Sokubai. The amount of polyethyleneimine in the fire fighting foam concentrates of the present invention can generally range from 0.1 to 15 percent by weight and preferably from 0.2 to 12 percent by weight.

In known fire fighting compositions, such as U.S. Pat. No. 6,518,345, a polybasic acid compound is utilized to undergo electrostatic interaction with a polyethyleneimine for the purpose of improving flame resistance and fuel resistance when used as fire fighting foam concentrates. Unlike these known fire fighting compositions, the fire fighting foam concentrates of the present invention do not require the use of a polybasic acid compound because the multiple betaine groups in the fluorobetaine copolymers of Formula (4) undergo an electrostatic interaction with polyethyleneimine and therefore can completely replace any polybasic acid while providing flame resistance and fuel resistance when used as fire fighting foam concentrates.

In addition to the fluorobetaine copolymer of Formula (4), the fire fighting foam concentrates of the present invention preferably include at least one hydrocarbon surfactant which can be cationic, anionic, non-ionic, amphoteric, or mixtures thereof. Examples of hydrocarbon surfactant include cetyltrimethylammonium bromide, quaternized cocoamine ethoxylate, Triton X100 (trade name of Union Carbide), and dioctyl sodium sulfosuccinate. The amount of hydrocarbon surfactant in the fire fighting foam concentrates of the present invention can generally range from 0.1 to 20 percent by weight and preferably from 0.2 to 15 percent by weight.

EXAMPLES

The following describes the materials used in the examples below. LUPASOL PS (BASF AG trade name) is a polyethyleneimine with an average molecular weight of 750,000 mol/g and a solids content of 31.5-34.5 weight percent. EPOMIN 1050 (Nippon Sokubai trade name) is a polyethyleneimine with an average molecular weight of 70,000 mol/g and a solids content of 50 weight percent. AMPHOTENSID B4F (Zschimmer & Schwarz trade name) is a hydrocarbon surfactant with a solids content of 35 weight percent. The fluorinated acrylate monomer used was 2-[methyl[(3,3,4,4,5,5,6,6,7,7,8,8,8-tridecafluorooctyl sulfonyl]amino]ethyl acrylate. The comparative monomeric fluorosurfactant surfactant used is made in accordance with U.S. Pat. No. 3,721,706 and comprises molecules each having a perfluorinated alkyl chain and one betaine group.

Extinguishing times were measured according to the following procedure. 150 mL of acetone was poured into a circular metal container with an internal diameter of 115 mm. Moreover, an aqueous solution composed of the fire fighting foam concentrate diluted to 6 percent by weight in tap water was prepared. This solution was the foaming solution. A rotary stirrer composed of a motor and a metal rod, at the end of which were attached paddles produced a mechanical effect when the rod was being rotated; the rotational speed is adjustable from 0 to 2,800 rpm. The rod was introduced into the bottom of a cylindrical container equipped with an inlet orifice located at the bottom and with an outlet orifice located at the top. A metering pump transfers, via the inlet orifice, the aqueous solution to the bottom of the cylindrical container; foam was produced on contact with the rotating paddles, which foam was discharged as it was formed, via the outlet orifice. The throughput of the pump and the rotational speed of the rod were adjusted so that foam is continuously produced with a stationary foam throughput equal to about 40 g per minute. When the foam throughput was stabilized, the acetone was ignited. After the acetone burned for 90 seconds, the foam was poured into the metal container via a single point situated on the circumference. When the acetone was completely extinguished, the extinguishing time was recorded. The foam concentrates with the best performance on polar solvent were those for which the extinguishing time was as low as possible.

Re-ignition times were measured according to the following procedure. This parameter can be evaluated if the extinguishing time was less than 120 seconds. In this case, the foam was poured over the acetone even after the fire seat was extinguished. In all the cases described here, the foam was poured for 120 s. 60 s after the pouring of the foam was halted, the contents of re-ignition vessels (metal container with a diameter of 55 mm and height of 40 mm filled with acetone to a height of 20 mm) was ignited. The re-ignition vessel was placed at the center of the metal container described above, the surface of fuel present in the said container being kept covered with foam. The time at the end of which the flames destroyed 25% of the surface initially covered the foam and spread in a lasting fashion over the surface of the metal container was recorded. The greater this time, the better the ability of the foam to prevent the resurgence of the fire.

Example 1

A fluorobetaine copolymer of the invention was made according to the following procedure. To a double-jacketed 2.5-L reactor was added dimethylaminoethylmethacrylate (183.8 g, 1.17 mol), fluorinated acrylate monomer (81.8 weight percent purity in acetone, 110.0 g, 0.167 mol), t-butanol (422.9 g, 5.71 mol), and n-dodecyl mercaptan (19.9 g, 97.9 mmol) while stirring (200 rpm). The temperature was raised to 70° C. The reactor was purged with a nitrogen flow for 25 minutes. Azobisisobutyronitrile (1.42 g, 8.64 mmol) was added to the solution. The temperature was maintained for 4 hours under nitrogen. Azobisisobutyronitrile (0.35 g, 2.13 mmol) was added to the solution and the temperature was maintained for 3 hours under nitrogen. A solution of sodium chloroacetate (141.6 g, 1.22 mol) in water (1303.4 g) was added drop by drop over the course of 1 hour and 10 minutes. The temperature was maintained at 70° C. for 1 hour. From this mixture, 500 g of solvent was removed by distillation. The solid content of the solution was 26.3 weight percent including 4.16 weight percent of NaCl and the pH was 4.1. The targeted molecular weight of the fluorobetaine copolymer was 3,700 g·mol$^{-1}$.

Example 2

A fire fighting foam concentrate of the invention was made according to the following procedure. 33 g of tap water, 18 g of LUPASOL PS, 2.85 g of AMPHOTENSID B4F, 9.1 g of the product of Example 1 was added at room temperature under vigorous stirring, the pH is adjusted to 7.5 by diglycolic acid, and the solution was adjusted up to 100 g with tap water. A foaming solution was obtained by a dilution of this adjusted solution at 6 percent by weight in tap water to obtain a solution containing 144 ppm of fluorine. The resulting solution, subjected to the tests described above, exhibited the following characteristics: 1 minutes and 27 seconds of extinguishing time; and 6 minutes 10 seconds of re-ignition time.

Comparative Example A

A comparative fire fighting foam concentrate was made according to the following procedure. 33 g of tap water, 18 g of LUPASOL PS, 2.85 of AMPHOTENSID B4F, and 5.0 g of comparative monomeric fluorosurfactant (solid content: 27 weight percent) were added at room temperature under vigorous stirring, the pH was adjusted to 7.5 by diglycolic acid, and the solution was adjusted up to 100 g with tap water. A foaming solution was obtained by a dilution of this solution at 6 percent by weight in tap water in order to obtain a solution containing 225 ppm of fluorine. The resulting solution, subjected to the tests described above, exhibited the following characteristics: greater than 4 minutes of extinguishing time.

Example 3

A fire fighting foam concentrate of the invention was made according to the following procedure. 33 g of tap water, 12 g of EPOMIN P-1050, 2.85 of AMPHOTENSID B4F, and 9.1 g of the product of Example 1 was added at room temperature under vigorous stirring, the pH was adjusted to 7.5 by diglycolic acid, and the solution was adjusted up to 100 g with tap water. A foaming solution was obtained by a dilution of this solution at 6 percent by weight in tap water in order to obtain a solution containing 144 ppm of fluorine. The resulting solution, subjected to the tests described above, exhibited the following characteristics: 1 minute and 32 seconds of extinguishing time; and 5 minutes and 48 seconds of re-ignition time.

Comparative Example B

A comparative fire fighting foam concentrate was made according to the following procedure. 33 g of water, 12 g of EPOMIN P-1050, 2.85 g of AMPHOTENSID B4F, and 1.96 g of comparative monomeric fluorosurfactant (solid content: 27 weight percent) were added at room temperature under vigorous stirring, the pH was adjusted to 7.5 by diglycolic acid, and the solution was adjusted up to 100 g with tap water. A foaming solution was obtained by a dilution of this solution at 6 percent by weight in tap water in order to obtain a solution containing 144 ppm of fluorine. The resulting solution, subjected to the tests described above, exhibited the following characteristics: greater than 4 minutes of extinguishing time.

Example 4

A fire fighting foam concentrate of the invention was made according to the following procedure. 33 g of tap water, 20 g of EPOMIN P-1050, 2.85 g of AMPHOTENSID B4F, and 9.1 g of the product of Example 1 were added at room temperature under vigorous stirring, the pH was adjusted to 7.5 by chloridric acid, and the solution was adjusted up to 100 g with tap water. A foaming solution was obtained by a dilution of this solution at 6 percent by weight in tap water in order to obtain a solution containing 144 ppm of fluorine. The resulting solution, subjected to the tests described above, exhibited the following characteristics: 1 minute and 36 seconds of extinguishing time; and 7 minutes and 2 seconds of re-ignition time.

In the examples above: Example A is a comparative example of Example 2; and Example B is a comparative Example of 3. In these examples, an evaluation was preformed comparing the effect of fluorobetaine copolymers (Examples 2 and 3) versus the effect of comparative monomeric fluorosurfactant (Examples A and B) upon extinguishing times. The fluorobetaine copolymer and comparative monomeric fluorosurfactant were analogous in that both have betaine groups. However the fluorobetaine copolymers have multiple betaine groups per molecule while the comparative monomeric surfactant only had a single betaine group per molecule. Thus the fluorobetaine copolymers had a greater ability to undergo electrostatic interaction with other components which resulted in improved fire fighting performance. Evidence of this can be seen in Example 2 where the fluorobetaine copolymer yielded an extinguishing time of 2 minutes and 17 seconds. Under similar conditions in Example A, the comparative monomeric fluorosurfactant yielded an extinguishing time greater than 4 minutes. Further evidence can be seen in Example 3 where the fluorobetaine copolymer yielded an extinguishing time of 1 minute and 32 seconds. Under similar conditions in Example 3A, the comparative monomeric fluorosurfactant yielded an extinguishing time greater than 4 minutes.

Although Example 3 and 4 both represent a fire fighting foam concentrate of the invention and both use a fluorobetaine copolymer of the invention, a polybasic acid compound was used in Example 4 while a monobasic acid compound was used in Example 3. As demonstrated by the similar extinguishing and re-ignition times of Examples 3 and 4, a polybasic acid was not required to impart fire fighting performance when using a fluorobetaine copolymer of the invention. In contrast, known fire fighting compositions, such as U.S. Pat. No. 6,518,345, require a polybasic acid to undergo electrostatic interaction with a polyethyleneimine for the purpose of improving fire fighting performance. The present invention does not require the use of a polybasic acid compound because the multiple betaine groups in the fluorobetaine copolymers of Formula (4) undergo an electrostatic interaction with polyethyleneimine and therefore can completely replace any polybasic acid while providing flame resistance and fuel resistance when used as fire fighting foam concentrates.

What is claimed is:

1. A fluorocopolymer having a molecular weight less than 10,000 g/mol comprising units represented by the following formula:

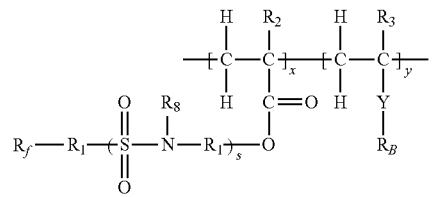

wherein $R_f$ represents a perfluorinated alkyl group, optionally interrupted by oxygen, having 3 to 6 carbon atoms; each $R_1$ is independently chosen from a $C_1$-$C_{20}$ hydrocarbylene; $R_8$ is chosen from a $C_1$-$C_{20}$ hydrocarbyl or hydrogen; $R_2$ is chosen from hydrogen, fluorine, or a $C_1$-$C_4$; s is 0 or 1; Y is benzyl or carbonyl; $R_B$ is a group with the formula $C_a N_b O_c S_f H_{2(a-e)+b+1-2d}$ having a structure which incorporates at least one betaine group of the formula $(N^+$—$C_n H_{2n}$—$CO_2^-)$ or $(N^+$—$C_n H_{2n}$—$SO_3^-)$ wherein a is an integer from 4-25, b is an integer from 1 to 4, c is an integer from 2 to 15, d is an integer from 0 to 3, e is an integer from 0 to 4, f is an integer from 0 to 4, the sum of e and f is from 1 to 4; n is independently chosen from an integer from 1 to 5; and $R_3$ is chosen from hydrogen or a $C_1$-$C_4$ hydrocarbyl; provided that 2(a−e)+b+ 1−2d equals an integer from 8 to 55; and x is an integer from 1 to 10, y is an integer from 4 to 200, and the ratio of y:x is at least 1:1;

wherein the repeat unit containing $R_B$ is formed by reacting a betaine forming compound with the repeat unit of a monomer selected from 2-(dimethylamino)-1-[(dimethylamino)methyl]ethyl acrylate, 3-(dimethylamino)-2,2-dimethylpropyl acrylate, 2-(4-morpholinyl)ethyl acrylate, 2-(4-morpholinyl)ethyl methacrylate, 2-(1-piperidinyl)ethyl methacrylate, 2-(1-piperidinyl)ethyl acrylate, 3-(dimethylamino)propyl acrylate, 2-[bis(1-methylethyl)amino]ethyl methacrylate, 2-(dimethylamino)ethyl acrylate, 2-(diethylamino)ethyl acrylate, 2-(diethylamino)ethyl methacrylate, 1-methyl-4-(2-methyl-1-oxo-2-propenyl)-piperazine, 4-ethyenyl-N,N-dimethylbenzylamine, or N-(p-vinylbenzyl)dibutylamine.

2. The fluorocopolymer of claim 1 wherein s is 1.

3. The fluorocopolymer of claim 1 wherein each $R_1$ is independently a $C_1$-$C_5$ hydrocarbylene; $R_8$ is chosen from $C_1$-$C_5$ hydrocarbyl or hydrogen; $R_2$ is chosen from hydrogen or methyl; Y is carbonyl; $R_3$ is chosen from hydrogen or methyl.

4. A method for making the fluorocopolymer of claim 1 comprising the steps of:

A) polymerizing monomers comprising at least one fluorinated acrylate monomer and at least one amino vinyl monomer represented respectively by Formula (1) and Formula (2) as follows:

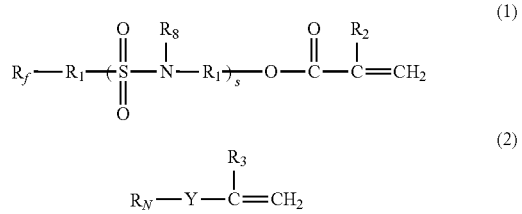

wherein $R_f$ represents a perfluorinated alkyl group, optionally interrupted by oxygen, having 3 to 6 carbon atoms; each $R_1$ is independently chosen from a $C_1$-$C_{20}$ hydrocarbylene; $R_8$ is chosen from a $C_1$-$C_{20}$ hydrocarbyl; $R_2$ is chosen from hydrogen, fluorine, or a $C_1$-$C_4$ alkyl; $R_8$ is chosen from a $C_1$-$C_{20}$ hydrocarbyl or hydrogen; $R_N$ is a group incorporating at least one tertiary amine said group having the formula $C_aN_bO_cH_{2a+b+1-2d}$ where a is an integer from 3 to 20, b is a positive integer from 1 to 4, and c is an integer from 0 to 4, and d is an integer from 0 to 4; provided that 2(a−e)+b−1−2d equals an integer from 8 to 55; and Y is carbonyl or benzyl; and $R_3$ is chosen from hydrogen or a $C_1$-$C_4$ hydrocarbyl; and B) reacting the polymer obtained in step A) with at least one betaine forming compound chosen from:

i) an aliphatic halocarboxylic acid having the formula X-A-COOH or alkaline earth metal salt thereof wherein X is a halogen, A is a $C_1$ to $C_4$ alkylene; or ii) an aliphatic halosulfonic acid having the formula X-A-$SO_3H$ or alkaline earth metal salt thereof wherein X is a halogen; A is a $C_1$ to $C_4$ alkylene.

5. The method of claim 4 wherein s is 1.

6. The method of claim 4 wherein the betaine forming compound is the alkaline earth metal salt of the aliphatic halocarboxylic acid or the alkaline earth metal salt of the aliphatic halosulfonic acid.

7. A fire fighting foam concentrate comprising the fluorocopolymer of claim 1.

8. The fire fighting foam concentrate of claim 7 further comprising a polyethyleneimine.

9. The fire fighting foam concentrate of claim 8 further comprising a monobasic acid, polybasic acid or mixtures thereof.

10. The fire fighting foam concentrate of claim 7 further comprising a hydrocarbon surfactant.

11. A method of extinguishing a hydrocarbon or polar solvent fire comprising contacting the fire with a foam, wherein the foam comprises a fluoropolymer comprising units represented by the following formula:

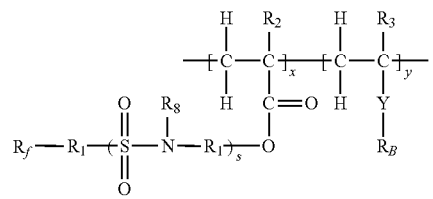

wherein $R_f$ represents a perfluorinated alkyl group, optionally interrupted by oxygen, having at least 3 carbon atoms; each $R_1$ is independently chosen from a $C_1$-$C_{20}$ hydrocarbylene; $R_8$ is chosen from a $C_1$-$C_{20}$ hydrocarbyl or hydrogen; $R_2$ is chosen from hydrogen, fluorine, or a $C_1$-$C_4$; s is 0 or 1; Y is benzyl or carbonyl; $R_B$ is a group with the formula $C_aN_bO_c$-$S_fH_{2(a-e)+b+1-2d}$ having a structure which incorporates at least one betaine group of the formula ($N^+$—$C_nH_{2n}$—$CO_2^-$) or ($N^+$—$C_nH_{2n}$—$SO_3^-$) wherein a is an integer from 4-25, b is an integer from 1 to 4, c is an integer from 2 to 15, d is an integer from 0 to 3, e is an integer from 0 to 4, f is an integer from 0 to 4, the sum of e and f is from 1 to 4; n is independently chosen from an integer from 1 to 5; and $R_3$ is chosen from hydrogen or a $C_1$-$C_4$ hydrocarbyl; provided that 2(a−e)+b+ 1−2d equals an integer from 8 to 55; x is an integer from 1 to 10, y is an integer from 4 to 200, the ratio of y:x is at least 1:1;

wherein the repeat unit containing $R_B$ is formed by reacting a betaine forming compound with the repeat unit of a monomer selected from 2-(dimethylamino)-1-[(dimethylamino)methyl]ethyl acrylate, 3-(dimethylamino)-2,2-dimethylpropyl acrylate, 2-(4-morpholinyl)ethyl acrylate, 2-(4-morpholinyl)ethyl methacrylate, 2-(1-piperidinyl)ethyl methacrylate, 2-(1-piperidinyl)ethyl acrylate, 3-(dimethylamino)propyl acrylate, 2-[bis(1-methylethyl)amino]ethyl methacrylate, 2-(dimethylamino)ethyl acrylate, 2-(diethylamino)ethyl acrylate, 2-(diethylamino)ethyl methacrylate, 1-methyl-4-(2-methyl-1-oxo-2-propenyl)-piperazine, 4-ethyenyl-N,N-dimethylbenzylamine, or N-(p-vinylbenzyl)dibutylamine.

12. A method of claim 11, wherein the foam further comprises a polyethyleneimine.

13. A method of claim 11, wherein the foam further comprises a hydrocarbon surfactant.

* * * * *